No. 865,851. PATENTED SEPT. 10, 1907.
D. F. ARMSTRONG.
VEHICLE CARPET HOLDING SPRING.
APPLICATION FILED NOV. 30, 1906.
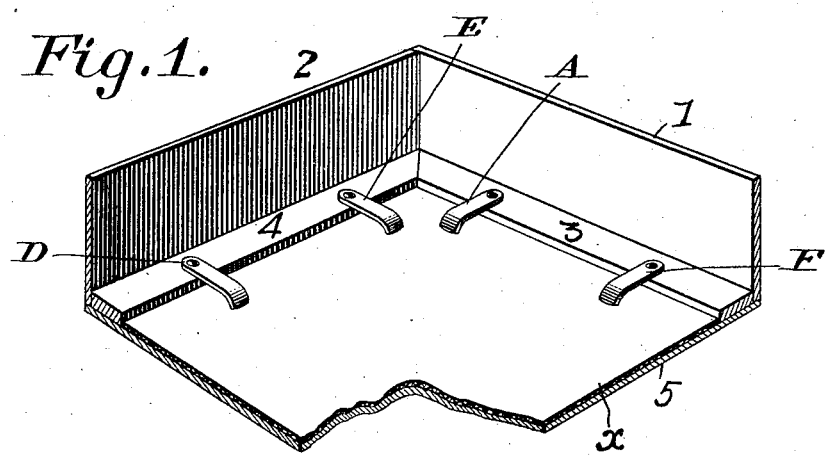
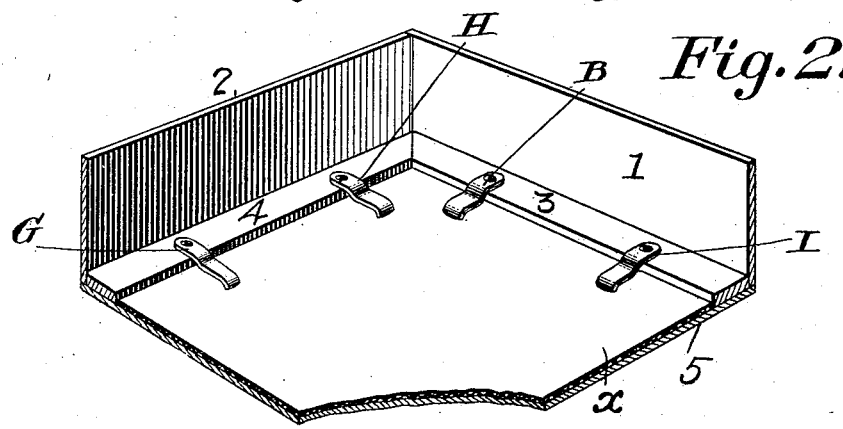
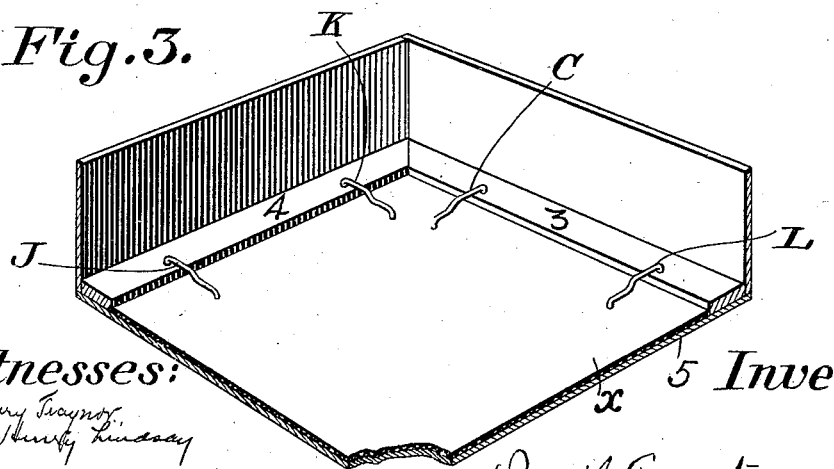
Witnesses:
Alda Mary Traynor
Robert Henry Lindsay
Inventor:
Daniel Forrester Armstrong

UNITED STATES PATENT OFFICE.

DANIEL FORRESTER ARMSTRONG, OF MALLORYTOWN, ONTARIO, CANADA.

VEHICLE CARPET-HOLDING SPRING.

No. 865,851.　　　　　Specification of Letters Patent.　　　　Patented Sept. 10, 1907.

Application filed November 30, 1906. Serial No. 345,832.

*To all whom it may concern:*

Be it known that I, DANIEL FORRESTER ARMSTRONG, a subject of the King of Great Britain, residing at Mallorytown, in the county of Leeds and Province of Ontario, Dominion of Canada, have invented certain new and useful Improvements in Vehicle Carpet-Holder Springs, of which the following is a specification.

My invention has for its object to hold in place without nailing, or otherwise fastening, the carpet on the floor of a vehicle whether the vehicle has a flat or oval surface: the springs to be placed at the end or at the sides of the space inclosed in the vehicle box, or both, as will be required to keep the carpet close to every portion of the floor of the vehicle, and the flat or round steel spring to be used according to the space available where a spring is required to be used.

My invention is illustrated in the accompanying drawing in which

Figures 1, 2, and 3 are perspective views of portions of a vehicle body having the carpet holders applied thereto.

In the drawings reference characters 1 and 2 represent a side and end of a vehicle body, respectively; 3 and 4 the sills; 5 the bottom, and *x* the carpet covering the same.

In Fig. 1 of the drawings, D, E, A, and F represent the holders. These holders are each made from a flat piece of steel secured to the sill by a nail or screw and having its point turned downward to impinge upon and hold the carpet covering in position upon the bottom of the vehicle body.

In Fig. 2, G, H, B, I, represent holders having a crimp adjacent to the sill so as to carry the body of the holder down to and to lie flat against the carpet.

In Fig. 3, J, K, C, L, represent the holders each made from a piece of wire having its point turned down and inserted in the sill and having its body portion extended to impinge upon and hold the carpet covering in position.

I claim as my invention—

In a vehicle body and in combination with the sills thereof, of spring carpet holders secured to said sills, and having their points or portions of their bodies bent downwardly so as to impinge upon the carpet, substantially as described.

In testimony whereof I have signed my name to these specifications in the presence of two subscribing witnesses.

DANIEL FORRESTER ARMSTRONG.

Witnesses:
　WM. SMITH,
　ALDA M. TRAYNOR.